United States Patent
Chun et al.

(10) Patent No.: US 9,515,796 B2
(45) Date of Patent: Dec. 6, 2016

(54) METHOD AND APPARATUS FOR ALLOCATING A DOWNLINK CONTROL CHANNEL IN A WIRELESS COMMUNICATION SYSTEM

(75) Inventors: Jin Young Chun, Anyang-si (KR); Ki Tae Kim, Anyang-si (KR); Su Nam Kim, Anyang-si (KR); Ji Won Kang, Anyang-si (KR); Bin Chul Ihm, Anyang-si (KR); Sung Ho Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 142 days.

(21) Appl. No.: 14/130,205

(22) PCT Filed: Jul. 4, 2012

(86) PCT No.: PCT/KR2012/005291
§ 371 (c)(1),
(2), (4) Date: Dec. 30, 2013

(87) PCT Pub. No.: WO2013/005977
PCT Pub. Date: Jan. 10, 2013

(65) Prior Publication Data
US 2014/0133429 A1    May 15, 2014

Related U.S. Application Data

(60) Provisional application No. 61/504,321, filed on Jul. 5, 2011.

(51) Int. Cl.
*H04L 5/00*    (2006.01)
*H04J 11/00*   (2006.01)

(52) U.S. Cl.
CPC ............ *H04L 5/0053* (2013.01); *H04J 11/004* (2013.01); *H04J 11/005* (2013.01); *H04L 5/005* (2013.01); *H04L 5/0007* (2013.01); *H04L 5/0035* (2013.01)

(58) Field of Classification Search
CPC ... H04L 5/0053; H04L 5/005; H04L 5/0035; H04L 5/0007; H04L 2025/03796; H04L 27/261; H04L 27/262; H04L 27/2613; H04J 11/004; H04J 11/005; H04J 11/0023; H04J 11/0079; H04W 72/1289
See application file for complete search history.

(56) References Cited

U.S. PATENT DOCUMENTS

2011/0044391 A1* 2/2011 Ji et al. ............... 375/260
2011/0170496 A1* 7/2011 Fong ........... H04L 5/0053
                                                370/329

(Continued)

FOREIGN PATENT DOCUMENTS

KR    10-2010-0051529 A    5/2010

OTHER PUBLICATIONS

Samsung, "PDCCH Extension to Support Operation with CI." 3GPP TSG RAN WG1 #59, R1-094569, Nov. 9-13, 2009. (Retrieved from the Internet on Dec. 7, 2012: <URL:http://www.3gpp.org/ftp/tsg_ran/WG1_RL1/TSGR1_59/Docs/R1-094569.zip>).

(Continued)

*Primary Examiner* — Benjamin H Elliott, IV
(74) *Attorney, Agent, or Firm* — Dentons US LLP

(57) ABSTRACT

Provided are a method and apparatus for allocating a downlink control channel in a wireless communication system. A base station allocates a downlink control channel to cell-specific reference signal (CRS) resource elements (REs) capable of transmitting a CRS and transmits a downlink control signal to a terminal through the allocated downlink control channel.

10 Claims, 20 Drawing Sheets

(56) References Cited

U.S. PATENT DOCUMENTS

| | | | |
|---|---|---|---|
| 2012/0039283 A1* | 2/2012 | Chen | H04W 72/042 370/329 |
| 2012/0106465 A1* | 5/2012 | Haghighat et al. | 370/329 |
| 2012/0120891 A1* | 5/2012 | Mazzarese et al. | 370/329 |
| 2012/0207126 A1* | 8/2012 | Qu et al. | 370/330 |
| 2013/0329686 A1* | 12/2013 | Kim et al. | 370/329 |
| 2014/0133429 A1* | 5/2014 | Chun | H04L 5/005 370/329 |

OTHER PUBLICATIONS

Nokia, Nokia Siements Networks, "On enhanced downlink control signalling for Rel-11." 3GPP TSG RAN WG1 Meeting #65, R1-111743, May 9-13, 2011. (Retrieved from the Internet on Dec. 7, 2012: <URL:http://www.3gpp.org/ftp/tsg_ran/WG1_RL1/TSGR1_65/Docs/R1-111743.zip>).

Samsung: "PDCCH Extension to Support Operation with CI"—R1-094569; 3GGP TSG RAN WG1 #59; Jeju, Korea, Nov. 9-13, 2009.

* cited by examiner

METHOD AND APPARATUS FOR ALLOCATING A DOWNLINK CONTROL CHANNEL IN A WIRELESS COMMUNICATION SYSTEM

This Application is a 35 U.S.C. §371 National Stage Entry of International Application No. PCT/KR2012/005291, filed Jul. 4, 2012 and claims the benefit of U.S. Provisional Application No. 61/504,321, filed Jul. 5, 2011, all of which are incorporated by reference in their entirety herein.

BACKGROUND OF THE INVENTION

Field of the Invention

The present invention relates to wireless communications and more particularly, a method and apparatus for allocating a downlink control channel in a wireless communication system.

Related Art

The next-generation multimedia wireless communication systems which are recently being actively researched are required to process and transmit various pieces of information, such as video and wireless data as well as the initial voice-centered services. The $4^{th}$ generation wireless communication systems which are now being developed subsequently to the $3^{rd}$ generation wireless communication systems are aiming at supporting high-speed data service of downlink 1 Gbps (Gigabits per second) and uplink 500 Mbps (Megabits per second). The object of the wireless communication system is to establish reliable communications between a number of users irrespective of their positions and mobility. However, a wireless channel has abnormal characteristics, such as path loss, noise, a fading phenomenon due to multi-path, inter-symbol interference (ISI), and the Doppler Effect resulting from the mobility of a user equipment. A variety of techniques are being developed in order to overcome the abnormal characteristics of the wireless channel and to increase the reliability of wireless communication.

Meanwhile, with the employment of machine-to-machine (M2M) communication and with the introduction and distribution of various devices such as a smart phone, a table personal computer (PC), etc., a data requirement size for a cellular network is increased rapidly. To satisfy a high data requirement size, various techniques are under development. A carrier aggregation (CA) technique, a cognitive radio (CR) technique, or the like for effectively using more frequency bands are under research. In addition, a multiple antenna technique, a multiple base station cooperation technique, or the like for increasing data capacity within a limited frequency are under research. That is, eventually, the wireless communication system will be evolved in a direction of increasing density of nodes capable of accessing to an area around a user. A wireless communication system having nodes with higher density can provide a higher performance through cooperation between the nodes. That is, a wireless communication system in which each node cooperates has a much higher performance than a wireless communication system in which each node operates as an independent base station (BS), advanced BS (ABS), node-B (NB), eNode-B (eNB), access point (AP), etc.

A distributed multi-node system (DMNS) comprising a plurality of nodes within a cell may be used to improve performance of a wireless communication system. The DMNS may include a distributed antenna system (DAS), a radio remote head (RRH), and so on. Also, standardization work is underway for various multiple-input multiple-output (MIMO) techniques and cooperative communication techniques already developed or applicable in a future so that they can be applied to the DMNS. Link quality is expected to be improved by employing the DMNS. However, introduction of a new control channel is also required for application of various MIMO techniques and cooperative techniques to the DMNS.

Accordingly, a method for allocating a new control channel for the DMNS efficiently is required.

SUMMARY OF THE INVENTION

The present invention provides a method and apparatus for allocating a downlink control channel in a wireless communication system. The present invention provides a method for allocating a new downlink control channel such as an enhanced physical downlink control channel (e-PDCCH) to resource elements used for a conventional cell-specific reference signal (CRS).

In an aspect, a method for allocating, by a base station, a downlink control channel in a wireless communication system is provided. The method includes allocating a downlink control channel to cell-specific reference signal (CRS) resource elements (REs) to which a CRS can be transmitted, and transmitting a downlink control signal through the allocated downlink control channel.

The downlink control channel may be an enhanced physical downlink channel (e-PDCCH) which is a downlink control channel for a multi-node system.

The e-PDCCH may be allocated to a maximum of 36 CRS REs in at least one resource block (RB).

The e-PDCCH may be allocated to CRS REs in at least one RB and a part of REs adjacent to the CRS REs.

The e-PDCCH may be allocated to a part of orthogonal frequency division multiplexing (OFDM) symbols including the CRS RE.

The e-PDCCH may be allocated to a maximum of 36 REs.

The downlink control channel may be an enhanced physical control format indicator channel (e-PCFICH) which is a downlink control channel for a multi-node system.

The e-PCFICH may be allocated to a maximum of 16 REs.

In another aspect, a method for receiving, by a user equipment, a downlink signal in a wireless communication system is provided. The method includes receiving a cell-specific reference signal (CRS) from a first node among a plurality of nodes through CRS resource elements (REs) to which a CRS can be transmitted, receiving a downlink signal from a second node among the plurality of nodes through the CRS REs, and decoding the received downlink signal by removing interference due to the CRS. The plurality of nodes has the same cell identifier (ID).

The downlink signal may be downlink data received through a physical downlink shared channel (PDSCH).

The downlink signal may be a downlink control signal received through an enhanced physical downlink channel (e-PDCCH) or enhanced physical control format indicator channel (e-PCFICH) which is a downlink control channel for a multi-node system.

The method may further include receiving information on the CRS.

The removing interference due to the CRS may be performed based on information about the CRS.

The removing interference due to the CRS may be commanded by a network.

The removing interference due to the CRS may be always performed in a specific subframe.

An e-PDCCH for a multi-node system can be allocated efficiently.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (Evolved UTRA), and the like. IEEE 802.16m, an evolution of IEEE 802.16e, provides backward compatibility with a system based on IEEE 802.16e. The UTRA is part of a universal mobile telecommunications system (UMTS). $3^{rd}$ generation partnership project (3GPP) long term evolution (LTE) is part of an evolved UMTS (E-UMTS) using the E-UTRA, which employs the OFDMA in downlink and the SC-FDMA in uplink. LTE-advanced (LTE-A) is an evolution of 3GPP LTE.

Hereinafter, for clarification, LTE-A will be largely described, but the technical concept of the present invention is not meant to be limited thereto.

Figure 1:
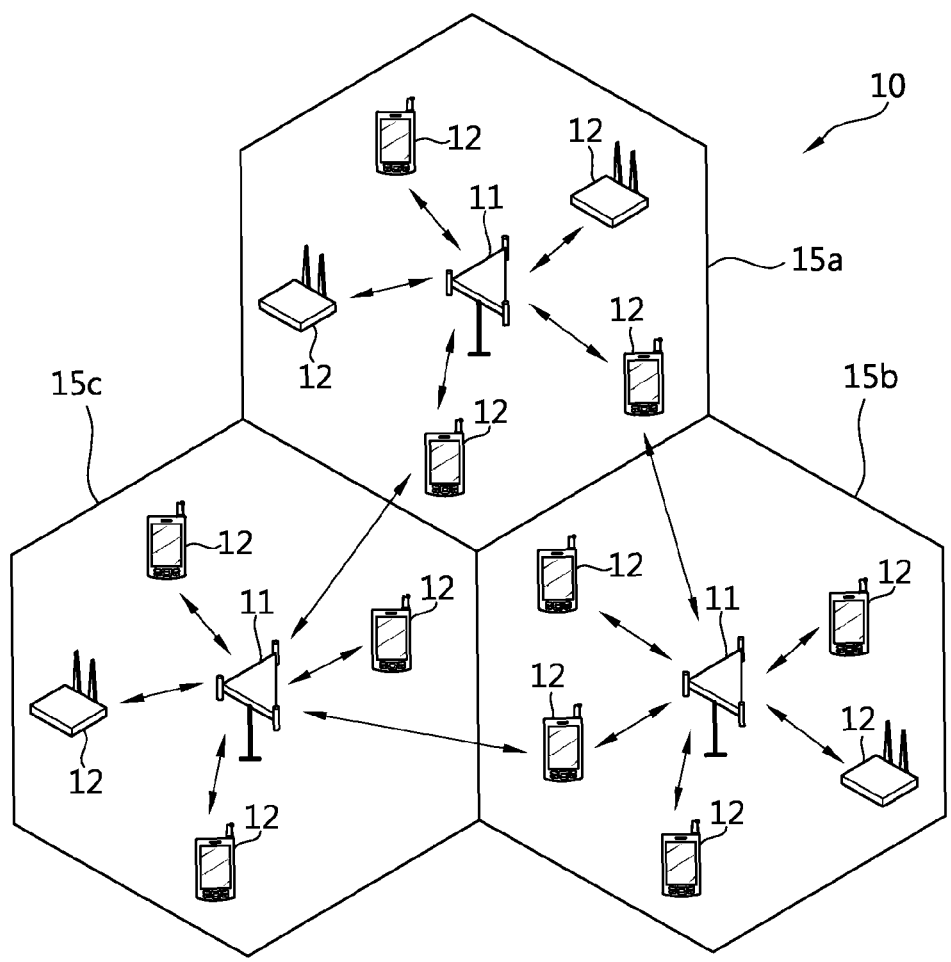
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile user equipment (MT), user equipment (UT), subscriber station (SS), wireless device, personal digital assistant (PDA), wireless modem, handheld device. The BS 11 generally refers to a fixed station that communicates with the UE 12 and may be called by other names such as evolved-NodeB (eNB), base transceiver system (BTS), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
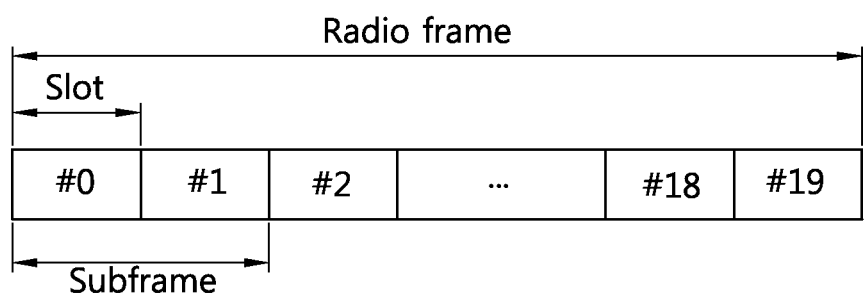
FIG. 2 shows a structure of a radio frame in 3GPP LTE.

FIG. 2 shows a structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03). Referring to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when SC-FDMA is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE cannot be simultaneously performed. In a TDD system in which an uplink transmission and a downlink transmission are discriminated in units of subframes, the uplink transmission and the downlink transmission are performed in different subframes.

Figure 3:
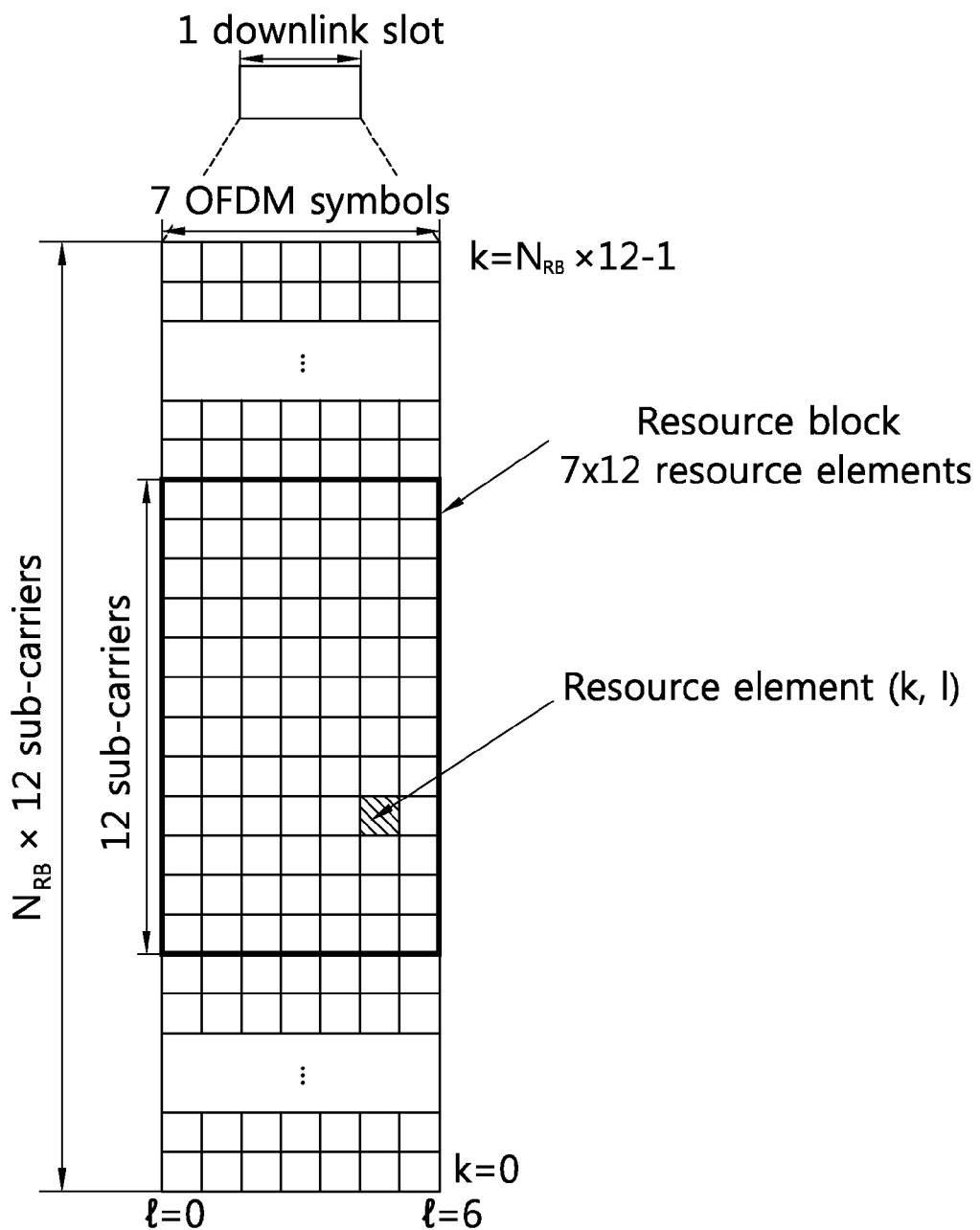
FIG. 3 shows an example of a resource grid of a single downlink slot.

FIG. 3 shows an example of a resource grid of a single downlink slot.

A downlink slot includes a plurality of OFDM symbols in the time domain and $N_{RB}$ number of resource blocks (RBs) in the frequency domain. The $N_{RB}$ number of resource blocks included in the downlink slot is dependent upon a downlink transmission bandwidth set in a cell. For example, in an LTE system, $N_{RB}$ may be any one of 6 to 110. One resource block includes a plurality of subcarriers in the frequency domain. An uplink slot may have the same structure as that of the downlink slot.

Each element on the resource grid is called a resource element. The resource elements on the resource grid can be identified by a pair of indexes (k,l) in the slot. Here, k (k=0, . . . , $N_{RB} \times 12-1$) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a CP, frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
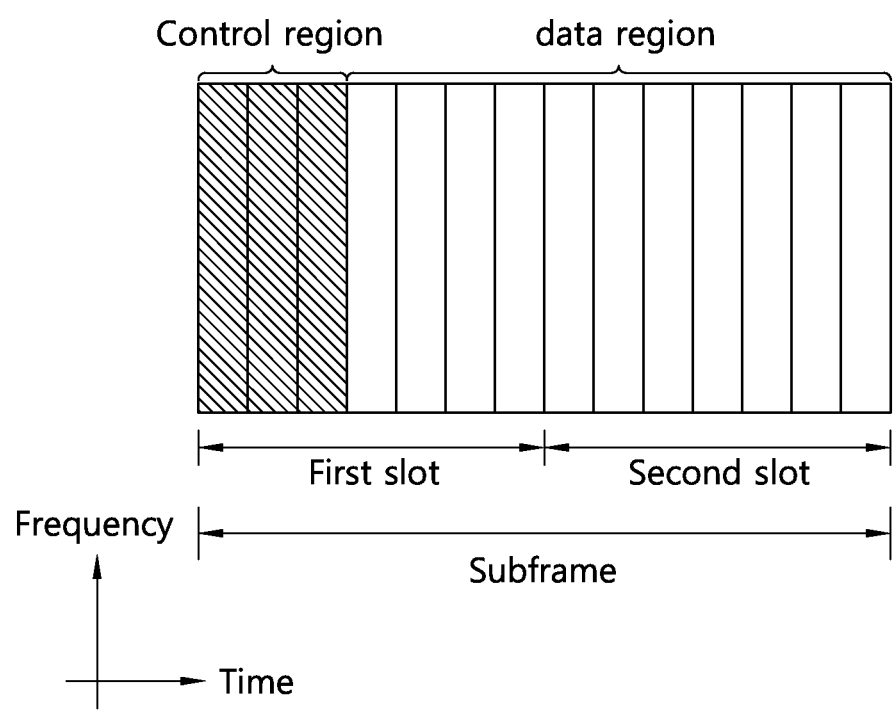
FIG. 4 shows a structure of a downlink subframe.

FIG. 4 shows a structure of a downlink subframe.

A downlink subframe includes two slots in the time domain, and each of the slots includes seven OFDM symbols in the normal CP. First three OFDM symbols (maximum four OFDM symbols for a 1.4 MHz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCE corresponds to a plurality of resource element groups. The format of the PDCCH and an available number of bits of the PDCCH are determined according to an associative relation between the number of the CCEs and a coding rate provided by the CCEs.

The BS determines a PDCCH format according to a DCI to be transmitted to the UE, and attaches a cyclic redundancy check (CRC) to the DCI. A unique radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC.

Figure 5:
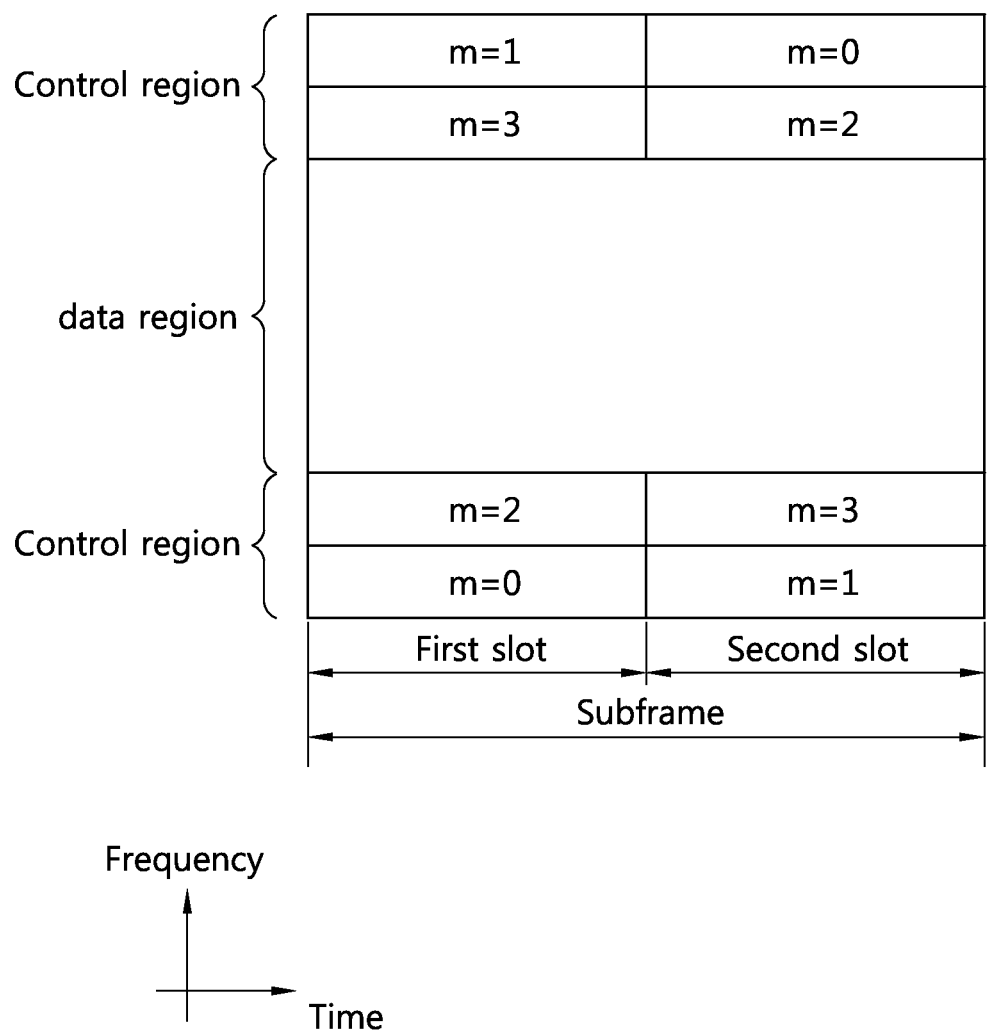
FIG. 5 shows a structure of an uplink subframe.

FIG. 5 shows a structure of an uplink subframe.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. When indicated by a higher layer, the UE may support a simultaneous transmission of the PUSCH and the PUCCH.

The PUCCH for a UE is allocated by a pair of RBs in a subframe. The resource blocks belonging to the pair of RBs occupy different subcarriers in first and second slots, respectively. The frequency occupied by the RBs belonging to the pair of RBs is changed based on a slot boundary. This is said that the pair of RBs allocated to the PUCCH is frequency-hopped at the slot boundary. The UE can obtain a frequency diversity gain by transmitting uplink control information through different subcarriers according to time. In FIG. 5, m is a position index indicating the logical frequency domain positions of the pair of RBs allocated to the PUCCH in the subframe.

Uplink control information transmitted on the PUCCH may include a hybrid automatic repeat request (HARQ)

acknowledgement/non-acknowledgement (ACK/NACK), a channel quality indicator (CQI) indicating the state of a downlink channel, a scheduling request (SR), and the like.

The PUSCH is mapped to an uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

To improve a performance of the wireless communication system, a technique is evolved in a direction of increasing density of nodes capable of accessing to an area around a user. A wireless communication system having nodes with higher density can provide a higher performance through cooperation between the nodes.

Figure 6:
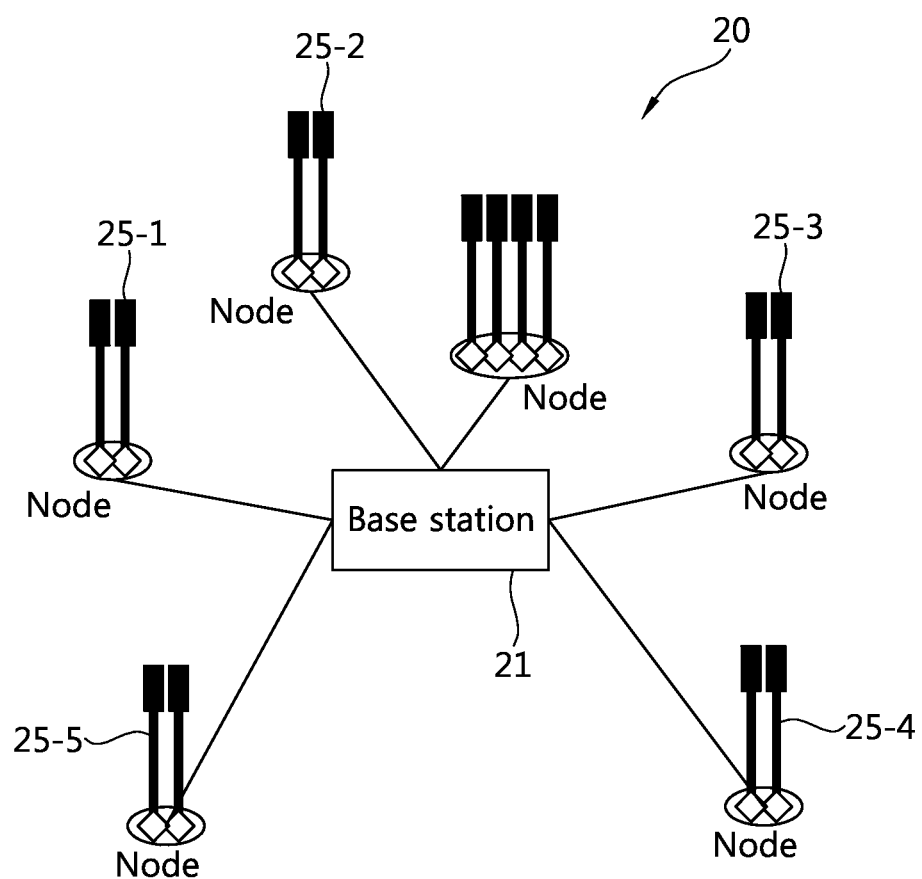
FIG. 6 shows an example of a multi-node system.

FIG. 6 shows an example of a multi-node system.

Referring to FIG. 6, a multi-node system 20 may consist of one BS 21 and a plurality of nodes 25-1, 25-2, 25-3, 25-4, and 25-5. The plurality of nodes 25-1, 25-2, 25-3, 25-4, and 25-5 may be managed by one BS 21. That is, the plurality of nodes 25-1, 25-2, 25-3, 25-4, and 25-5 operate as if they are a part of one cell. In this case, each of the nodes 25-1, 25-2, 25-3, 25-4, and 25-5 may be allocated a separate node identifier (ID), or may operate as if it is a part of an antenna group without an additional node ID. In this case, the multi-node system 20 of FIG. 6 may be regarded as a distributed multi node system (DMNS) which constitutes one cell.

Alternatively, the plurality of nodes 25-1, 25-2, 25-3, 25-4, and 25-5 may have separate cell IDs and perform a handover (HO) and scheduling of the UE. In this case, the multi-node system 20 of FIG. 6 may be regarded as a multi-cell system. The BS 21 may be a macro cell. Each node may be a femto cell or pico cell having cell coverage smaller than cell coverage of a macro cell. As such, if a plurality of cells is configured in an overlaid manner according to coverage, it may be called a multi-tier network.

In FIG. 6, each of the nodes 25-1, 25-2, 25-3, 25-4, and 25-5 may be any one of a BS, a Node-B, an eNode-B, a pico cell eNB (PeNB), a home eNB (HeNB), a remote radio head (RRH), a relay station (RS) or repeater, and a distributed antenna. At least one antenna may be installed in one node. In addition, the node may be called a point. In the following descriptions, a node implies an antenna group separated by more than a specific interval in a DMNS. That is, it is assumed in the following descriptions that each node implies an RRH in a physical manner. However, the present invention is not limited thereto, and the node may be defined as any antenna group irrespective of a physical interval. For example, the present invention may be applied by considering that a node consisting of horizontal polarized antennas and a node consisting of vertical polarized antennas constitute a BS consisting of a plurality of cross polarized antennas. In addition, the present invention may be applied to a case where each node is a pico cell or femto cell having smaller cell coverage than a macro cell, that is, to a multi-cell system. In the following descriptions, an antenna may be replaced with an antenna port, virtual antenna, antenna group, as well as a physical antenna.

First of all, a reference signal (RS) is described.

In general, a reference signal (RS) is transmitted as a sequence. Any sequence may be used as a sequence used for an RS sequence without particular restrictions. The RS sequence may be a phase shift keying (PSK)-based computer generated sequence. Examples of the PSK include binary phase shift keying (BPSK), quadrature phase shift keying (QPSK), etc. Alternatively, the RS sequence may be a constant amplitude zero auto-correlation (CAZAC) sequence. Examples of the CAZAC sequence include a Zadoff-Chu (ZC)-based sequence, a ZC sequence with cyclic extension, a ZC sequence with truncation, etc. Alternatively, the RS sequence may be a pseudo-random (PN) sequence. Examples of the PN sequence include an m-sequence, a computer generated sequence, a Gold sequence, a Kasami sequence, etc. In addition, the RS sequence may be a cyclically shifted sequence.

A downlink RS may be classified into a cell-specific reference signal (CRS), a multimedia broadcast and multicast single frequency network (MBSFN) reference signal, a UE-specific reference signal, a positioning reference signal (PRS), and a channel state information reference signal (CS-RS). The CRS is an RS transmitted to all UEs in a cell, and is used in channel measurement for a channel quality indicator (CQI) feedback and channel estimation for a PDSCH. The MBSFN reference signal may be transmitted in a subframe allocated for MBSFN transmission. The UE-specific RS is an RS received by a specific UE or a specific UE group in the cell, and may also be called a demodulation reference signal (DMRS). The DMRS is primarily used for data demodulation of a specific UE or a specific UE group. The PRS may be used for location estimation of the UE. The CSI RS is used for channel estimation for a PDSCH of a LTE-A UE. The CSI RS is relatively sparsely deployed in a frequency domain or a time domain, and may be punctured in a data region of a normal subframe or an MBSFN subframe. If required, a channel quality indicator (CQI), a precoding matrix indicator (PMI), a rank indicator (RI), etc., may be reported from the UE through CSI estimation.

A CRS is transmitted from all of downlink subframes within a cell supporting PDSCH transmission. The CRS may be transmitted through antenna ports 0 to 3 and may be defined only for $\Delta f=15$ kHz. The CRS may be referred to Section 6.10.1 of $3^{rd}$ generation partnership project (3GPP) TS 36.211 V10.1.0 (2011-03) "Technical Specification Group Radio Access Network: Evolved Universal Terrestrial Radio Access (E-UTRA): Physical channels and modulation (Release 8)".

Figure 7:
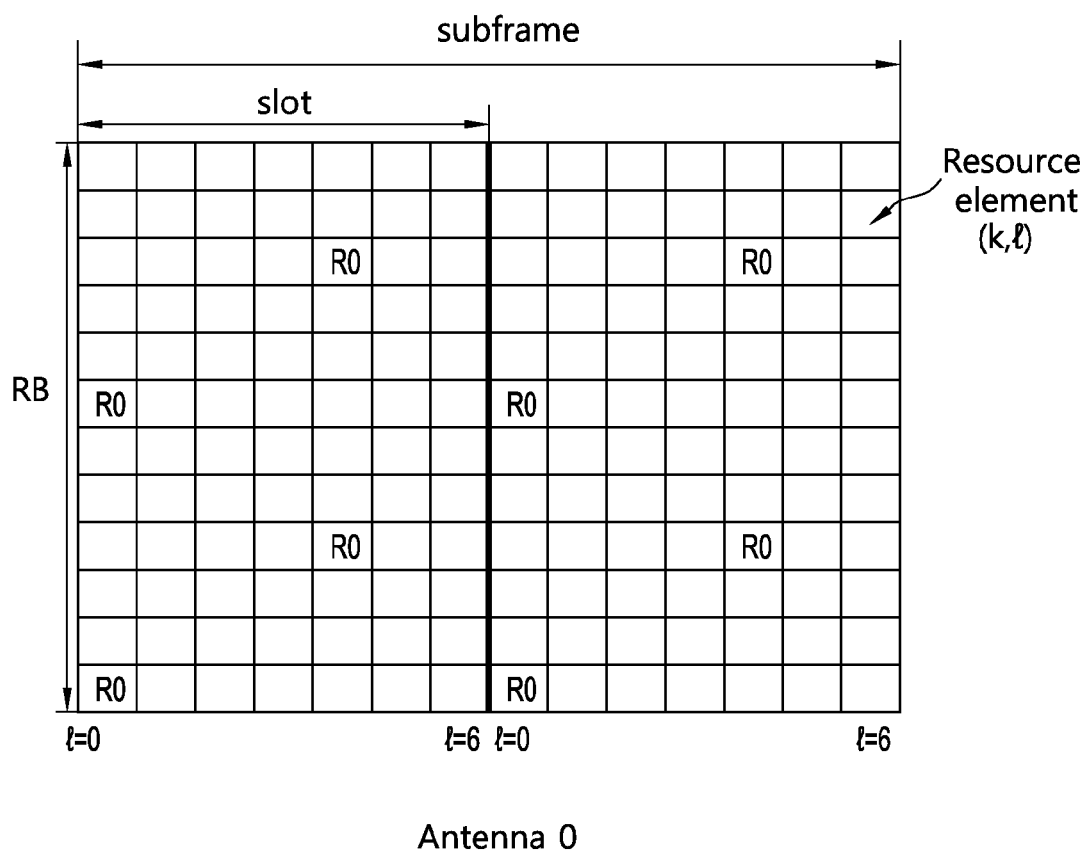
FIGS. 7 to 9 show examples of an RB to which a CRS is mapped.
Figure 8:
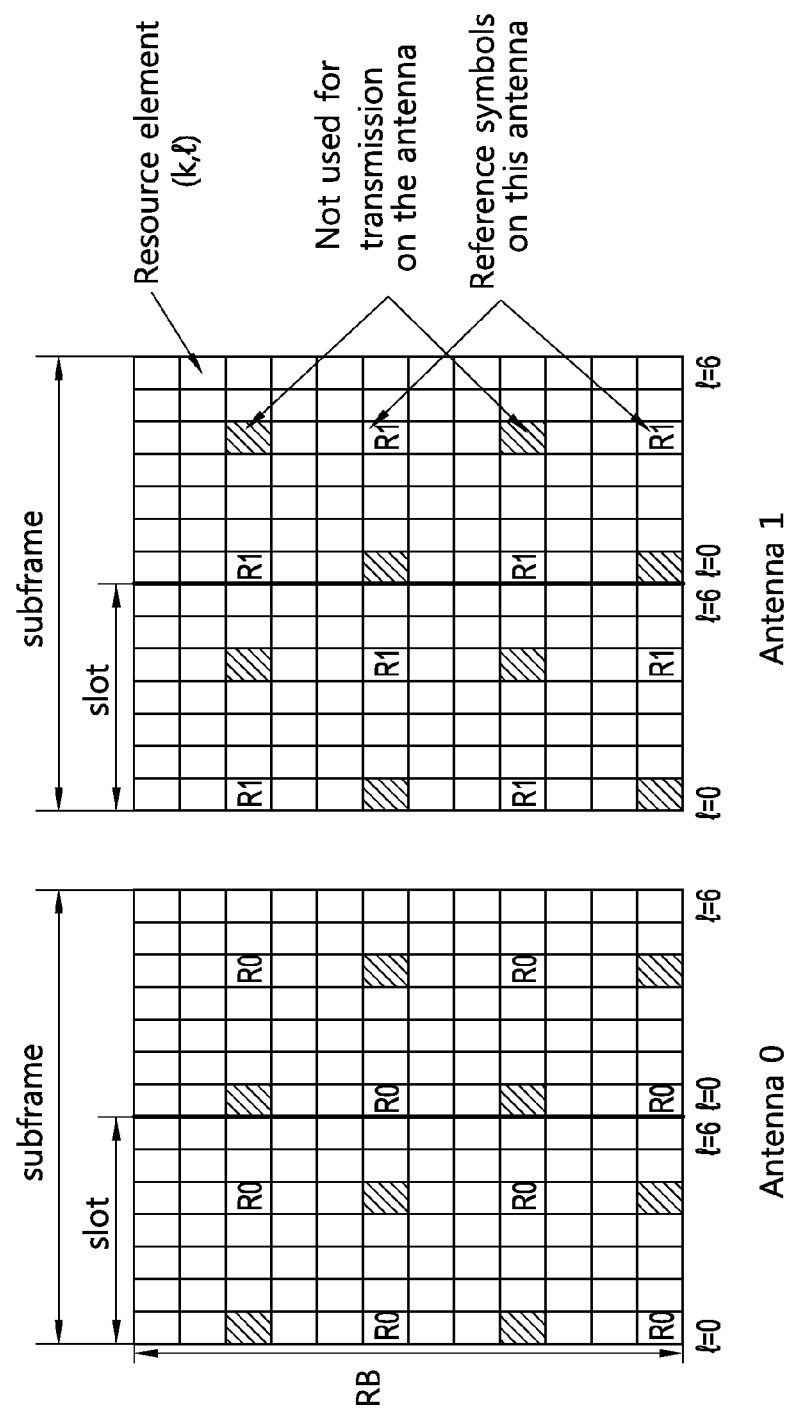
Figure 9:
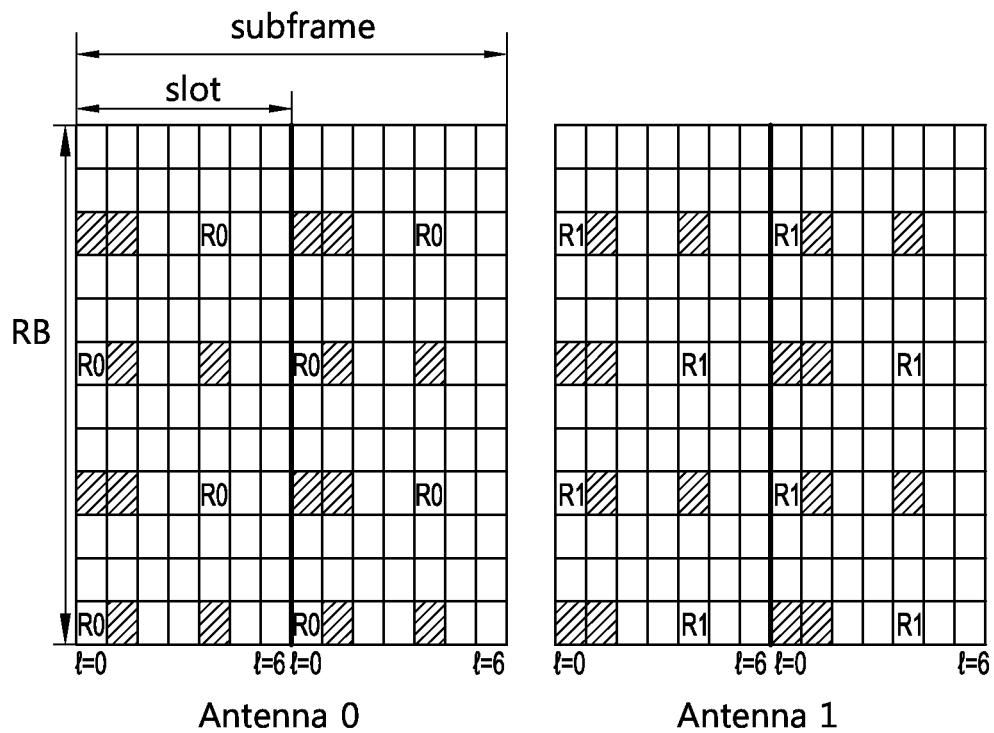
Figure 9:
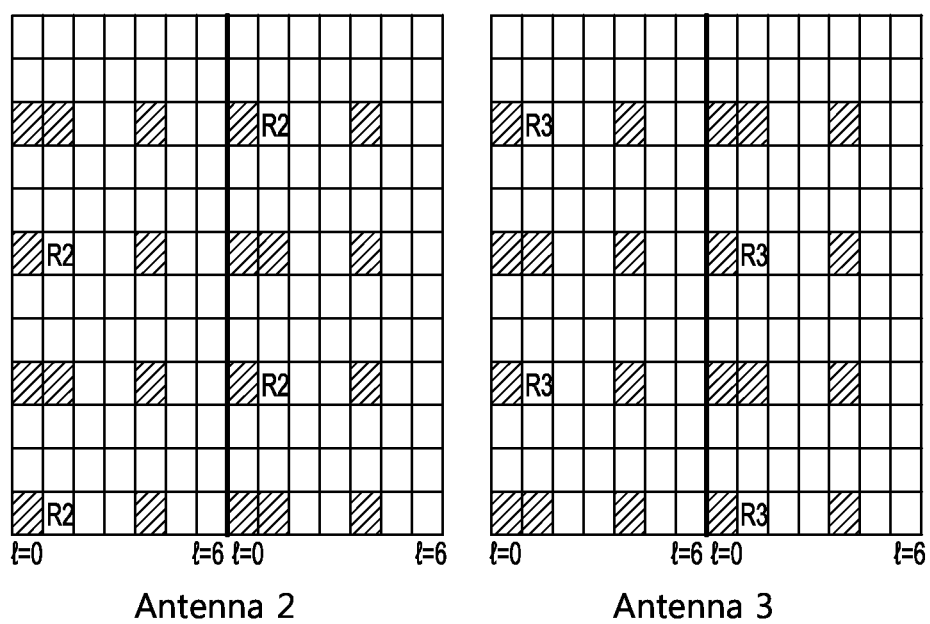

FIGS. 7 to 9 show examples of an RB to which a CRS is mapped.

FIG. 7 shows one example of a pattern in which a CRS is mapped to an RB when a base station uses a single antenna port. FIG. 8 shows one example of a pattern in which a CRS is mapped to an RB when a base station uses two antenna ports. FIG. 9 shows one example of a pattern in which a CRS is mapped to an RB when a base station uses four antenna ports. The CRS patterns may be used to support features of the LTE-A. For example, the CRS patterns may be used to support coordinated multi-point (CoMP) transmission/reception technique, spatial multiplexing, etc. Also, the CRS may be used for channel quality measurement, CP detection, time/frequency synchronization, etc.

Referring to FIGS. 7 to 9, in case the base station carries out multiple antenna transmission using a plurality of antenna ports, one resource grid is allocated to each antenna port. 'R0' represents a reference signal for a first antenna port. 'R1' represents a reference signal for a second antenna port. 'R2' represents a reference signal for a third antenna port. 'R3' represents a reference signal for a fourth antenna port. Positions of R0 to R3 within a subframe do not overlap with each other. l, representing the position of an OFDM symbol within a slot, may take a value ranging from 0 to 6 in a normal CP. In one OFDM symbol, a reference signal for each antenna port is placed apart by an interval of six subcarriers. The number of R0 and the number of R1 in a subframe are the same to each other while the number of R2 and the number of R3 are the same to each other. The number of R2 or R3 within a subframe is smaller than the number of R0 or R1. A resource element used for a reference signal of one antenna port is not used for a reference signal of another antenna port. This is intended to avoid generating interference among antenna ports.

The CRSs are always transmitted as many as the number of antenna ports regardless of the number of streams. The CRS has a separate reference signal for each antenna port. The frequency domain position and time domain position of the CRS within a subframe are determined regardless of user equipments. The CRS sequence multiplied to the CRS is also generated regardless of user equipments. Therefore, all of user equipments within a cell may receive the CRS. However, it should be noted that the CRS position within a subframe and the CRS sequence may be determined according to cell IDs. The time domain position of the CRS within a subframe may be determined according to an antenna port number and the number of OFDM symbols within a resource block. The frequency domain position of the CRS within a subframe may be determined according to an antenna port number, cell ID, OFDM symbol index (f), a slot number within a radio frame, etc.

The CRS sequence may be applied in unit of OFDM symbol within one subframe. The CRS sequence is varied according to a cell ID, a slot number within one radio frame, OFDM symbol index within the slot, type of CP, etc. Two reference signal subcarriers are involved for each antenna port on one OFDM symbol. In case a subframe includes $N_{RB}$ resource blocks in the frequency domain, the number of reference signal subcarriers for each antenna becomes $2 \times N_{RB}$ on one OFDM symbol. Accordingly, a length of a CRS sequence is $2 \times N_{RB}$.

Equation 1 shows an example of a CRS sequence r(m).

$$r(m) = \frac{1}{\sqrt{2}}(1 - 2 \cdot c(2m)) + j\frac{1}{\sqrt{2}}(1 - 2 \cdot (2m+1)) \quad \langle \text{Equation 1} \rangle$$

where m is 0, 1, ..., $2N_{RB}^{max}-1$. $2N_{RB}^{max}-1$ is the number of resource blocks corresponding to the maximum bandwidth. For example, in the 3GPP LTE system, $2N_{RB}^{max}-1$ is 110. c(i), a PN sequence, is a pseudo-random sequence, which may be defined by the Gold sequence of length 31. Equation 2 shows an example of the gold sequence c(n).

$c(n)=(x_1(n+N_C)+x_2(n+N_C))\mod 2$ $x_1(n+31)=(x_1(n+3)+x_1(n))\mod 2$ $x_2(n+31)=(x_2(n+3)+x_2(n+2)+x_2(n+1)+x_2(n))\mod 2$ <Equation 2> where $N_C$ is 1600. $x_1(i)$ is a first m-sequence, and $x_2(i)$ is a second m-sequence. For example, the first m-sequence or the second m-sequence may be initialized for each OFDM symbol according to a cell ID, slot number within one radio frame, OFDM symbol index within the slot, type of CP, etc.

In the case of a system having bandwidth smaller than $2N_{RB}^{max}$, only the specific part of length $2 \times N_{RB}$ from a reference signal sequence of length $2N_{RB}^{max}$ may be used.

Frequency hopping may be applied to the CRS. The period of frequency hopping pattern may be one radio frame (10 ms), and each frequency hopping pattern corresponds to one cell identity group.

At least one downlink subframe may be made of an MBSFN subframes by a higher layer within a radio frame on a carrier supporting PDSCH transmission. Each MBSFN subframe may be divided into a non-MBSFN region and an MBSFN region. The non-MBSFN region may occupy first one or two OFDM symbols within the MBSFN subframe. Transmission in the non-MBSFN region may be carried out based on the same CP as the one used in a first subframe (subframe #0) within a radio frame. The MBSFN region may be defined by OFDM symbols not used for the non-MBSFN region. The MBSFN reference signal is transmitted only when a physical multicast channel (PMCH) is transmitted, which is carried out through an antenna port 4. The MBSFN reference signal may be defined only in an extended CP.

A DMRS supports for PDSCH transmission, and is transmitted on the antenna port p=5, p=8, or p=7, 8, ..., v+6. At this time, v represents the number of layers used for PDSCH transmission. The DMRS is transmitted to one user equipment through any of the antenna ports belonging to a set S, where S={7, 8, 11, 13} or S={9, 10, 12, 14}. The DMRS is defined for demodulation of PDSCH and valid only when transmission of PDSCH is associated with the corresponding antenna port. The DMRS is transmitted only from a RB to which the corresponding PDSCH is mapped. The DMRS, regardless of the antenna port, is not transmitted in a resource element to which either of a physical channel and a physical signal is transmitted. The DMRS may be referred to Section 6.10.3 of the $3^{rd}$ generation partnership project (3GPP) TS 36.211 V10.1.0 (2011-03) "Technical Specification Group Radio Access Network; Evolved Universal Terrestrial Radio Access (E-UTRA): Physical channels and modulation (Release 8)".

Figure 10:
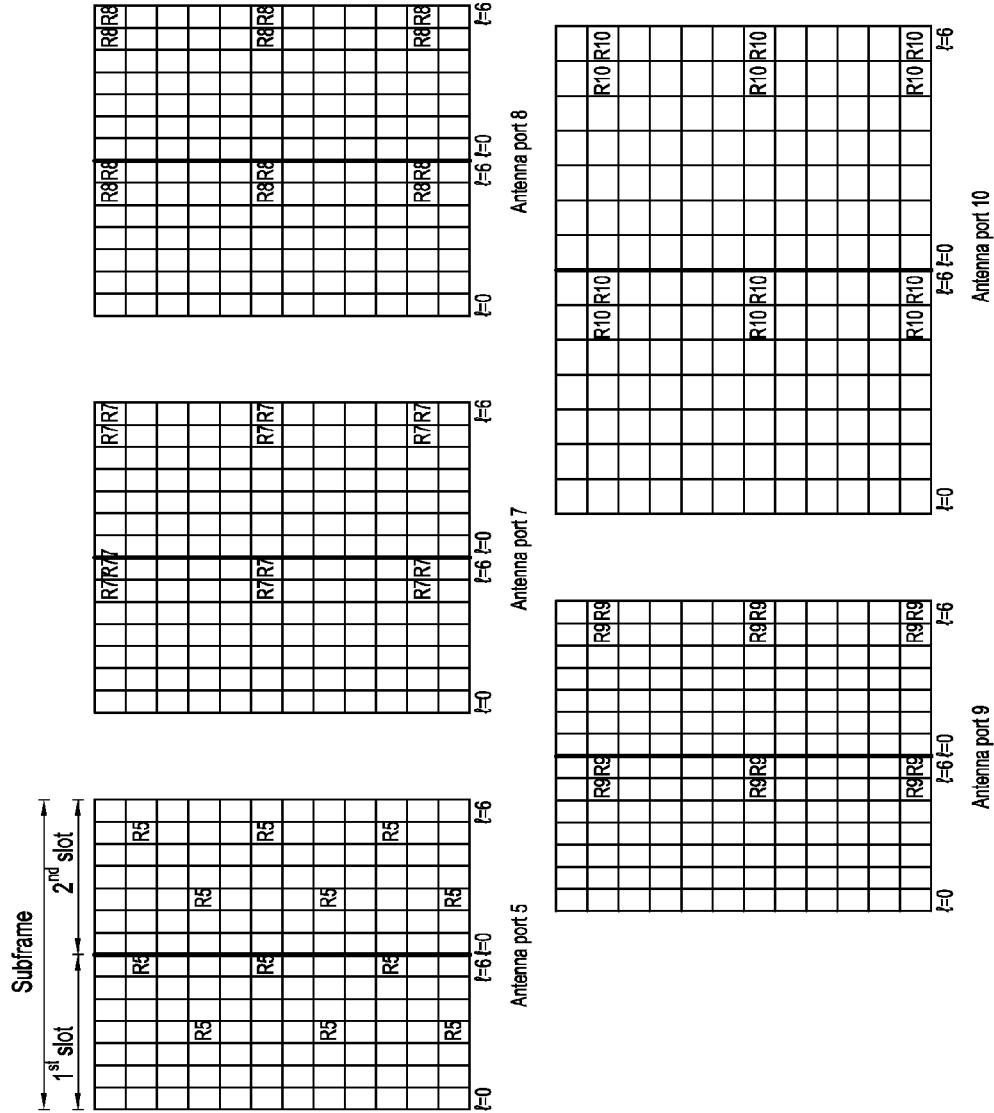
FIG. 10 shows an example of an RB to which a DMRS is mapped.

FIG. 10 shows an example of an RB to which a DMRS is mapped.

FIG. 10 shows resource elements used for the DMRS in a normal CP structure. $R_p$ denotes resource elements used for DMRS transmission on an antenna port p. For example, $R_5$ denotes resource elements used for DMRS transmission on an antenna port 5. Also, referring to FIG. 10, the DMRS for an antenna port 7 and 8 are transmitted through resource elements corresponding to a first, sixth, and eleventh sub-carriers (subcarrier index 0, 5, 10) of a sixth and seventh OFDM symbol (OFDM symbol index 5, 6) for each slot. The DMRS for the antenna port 7 and 8 may be identified by an orthogonal sequence of length 2. The DMRS for an antenna port 9 and 10 are transmitted through resource elements corresponding to a second, seventh, and twelfth sub-carriers (subcarrier index 1, 6, 11) of a sixth and seventh OFDM symbol (OFDM symbol index 5, 6) for each slot. The DMRS for the antenna port 9 and 10 may be identified by an orthogonal sequence of length 2. Since S={7, 8, 11, 13} or S={9, 10, 12, 14}, the DMRS for the antenna port 11 and 13 are mapped to resource elements to which the DMRS for the antenna port 7 and 8 are mapped, while the DMRS for the antenna port 12 and 14 are mapped to resource elements to which the DMRS for the antenna port 9 and 10 are mapped.

A CSI RS is transmitted through one, two, four, or eight antenna ports. The antenna ports used for each case is p=15, p=15, 16, p=15, . . . , 18, and p=15, . . . , 22, respectively. The CSI RS may be defined only Δf=15 kHz. The CSI RS may be referred to Section 6.10.5 of the 3$^{rd}$ generation partnership project (3GPP) TS 36.211 V10.1.0 (2011-03) "Technical Specification Group Radio Access Network; Evolved Universal Terrestrial Radio Access (E-UTRA): Physical channels and modulation (Release 8)".

Regarding transmission of the CSI RS, a maximum of 32 configurations different from each other may be taken into account to reduce inter-cell interference (ICI) in a multi-cell environment, including a heterogeneous network (HetNet) environment. The CSI RS configuration is varied according to the number of antenna ports within a cell and CP, and neighboring cells may have the most different configurations. Also, the CSI RS configuration may be divided into two types depending on a frame structure. The two types includes a type applied to both of FDD frame and TDD frame and a type applied only to the TDD frame. A plurality of CSI RS configurations may be used for one cell. For those user equipments assuming non-zero transmission power, 0 or 1 CSI configuration may be used. For those user equipments assuming zero transmission power, 0 or more CSI configurations may be used. The user equipment does not transmit the CSI RS in a special subframe of the TDD frame, in a subframe in which transmission of the CSI RS causes collision with a synchronization signal, a physical broadcast channel (PBCH), and system information block type 1, or in a subframe in which a paging message is transmitted. Also, in the set S, where S={15}, S={15, 16}, S={17, 18}, S={19, 20}, or S={21, 22}, resource elements by which the CSI RS of one antenna port is transmitted are not used for PDSCH or transmission of the CSI RS of a different antenna port.

Figure 11:
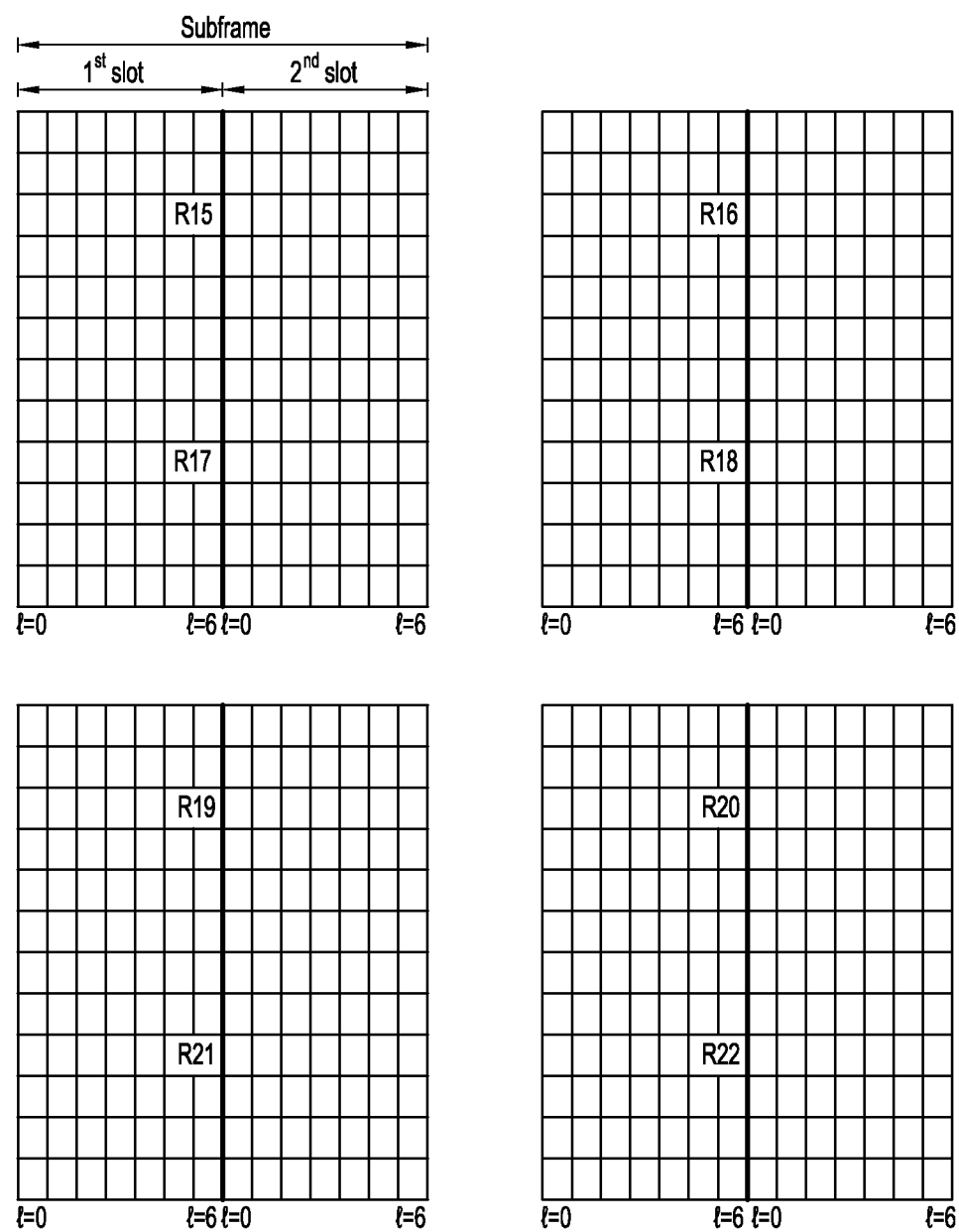
FIG. 11 shows an example of an RB to which a CSI RS is mapped.

FIG. 11 shows an example of an RB to which a CSI RS is mapped.

FIG. 11 shows resource elements used for the CSI RS in a normal CP structure. $R_p$ denotes resource elements used for CSI RS transmission on an antenna port p. Referring to FIG. 11, the CSI RS for an antenna port 15 and 16 are transmitted through resource elements corresponding to a third subcarrier (subcarrier index 2) of a sixth and seventh OFDM symbol (OFDM symbol index 5, 6) of a first slot. The CSI RS for an antenna port 17 and 18 is transmitted through resource elements corresponding to a ninth subcarrier (subcarrier index 8) of a sixth and seventh OFDM symbol (OFDM symbol index 5, 6) of the first slot. The CSI RS for an antenna port 19 and 20 is transmitted through the same resource elements as the CSI RS for an antenna port 15 and 16 is transmitted. The CSI RS for an antenna port 21 and 22 is transmitted through the same resource elements as the CSI RS for an antenna port 17 and 18 is transmitted.

Meanwhile, an RB may be allocated to a PDSCH in a distributed manner or in a continuous manner. The RB indexed sequentially in the frequency domain is called a physical RB (PRB), and the RB obtained by mapping the PRB one more time is called a virtual RB (VRB). Two types of allocation may be supported for allocation of VRBs. A localized type VRB is obtained from one-to-one direct mapping of PRBs indexed sequentially in the frequency domain. A distributed type VRB is obtained by distributed or interleaved mapping of the PRB according to particular rules. To indicate the VRB type, the DCI format 1A, 1B, 1C, and 1D transmitted to allocate the PDSCH through a PDCCH includes a localized/distributed VRB assignment flag. Whether the VRB is a localized type or a distributed type may be determined through the localized/distributed VRB assignment flag.

Hereinafter, a physical control format indicator channel (PCFICH) is described.

Figure 12:
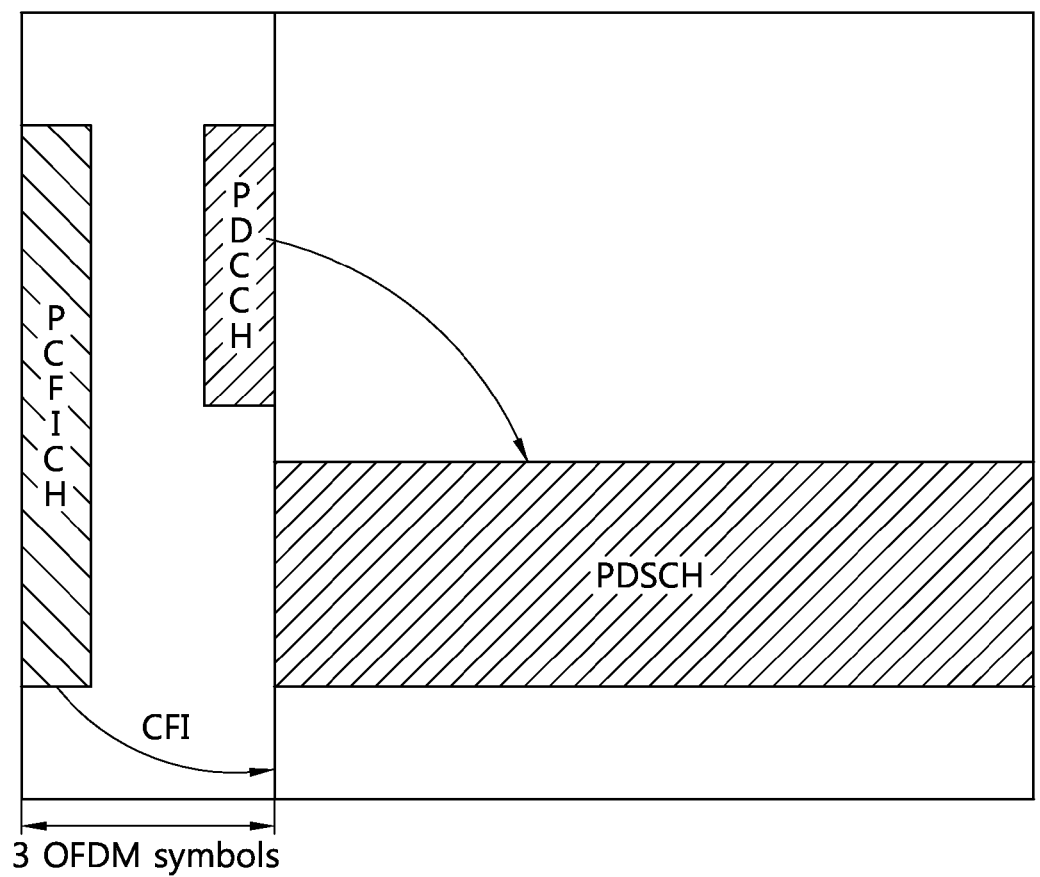
FIG. 12 shows an example where a PCFICH, PDCCH, and PDSCH are mapped to a subframe.

FIG. 12 shows an example where a PCFICH, PDCCH, and PDSCH are mapped to a subframe.

The 3GPP LTE allocates a PDCCH to transmit a downlink control signal intended for controlling user equipments. The region to which PDCCHs of a plurality of user equipments are mapped is called a PDCCH region or a control region. The PCFICH carries information about the number of OFDM symbols used for allocation of the PDCCH within a subframe. The information about the number of OFDM symbols to which the PDCCH is allocated is called a control formation indicator (CFI). All the user equipments within a cell have to search the region to which the PDCCH is allocated, and accordingly, the CIF may be set to a cell-specific value. In general, the control region to which the PDCCH is allocated is allocated to the OFDM symbols at the forefront of a downlink subframe, and the PDCCH may be allocated to a maximum of three OFDM symbols.

Referring to FIG. 12, CIF is set to 3, and accordingly, the PDCCH is allocated to the aforementioned three OFDM symbols within a subframe. The user equipment detects its own PDCCH within the control region and finds its own PDSCH through the detected PDCCH in the corresponding control region.

The PDCCH in the prior art was transmitted by using transmission diversity in a confined region and does not employ various techniques supporting the PDSCH such as beamforming, multi-user multiple-input multiple-output (MU-MIMO), and best band selection. Also, in case a distributed multi-node system is introduced for system performance enhancement, capacity of the PDCCH becomes short if cell IDs of a plurality of nodes or a plurality of RRHs are identical to each other. Therefore, a new control channel may be introduced in addition to the existing PDCCH. In what follows, a control channel newly defined is called an enhanced PDCCH (e-PDCCH). The e-PDCCH may be allocated in a data region rather than the existing control region. As the e-PDCCH is defined, a control signal for each node is transmitted for each user equipment, and the problem of shortage of the PDCCH region can be solved.

As the control region to which the PDCCH is allocated is specified by the PCFICH, a new channel specifying a region to which the e-PDCCH is allocated may be defined. In other words, an enhanced PCFICH (e-PCFICH) may be newly defined, which specifies a region to which the e-PDCCH is allocated. The e-PCFICH may carry part or all of information required for detecting the e-PDCCH. The e-PDCCH may be allocated to a common search space (CSS) within the existing control region or a data region.

Figure 13:
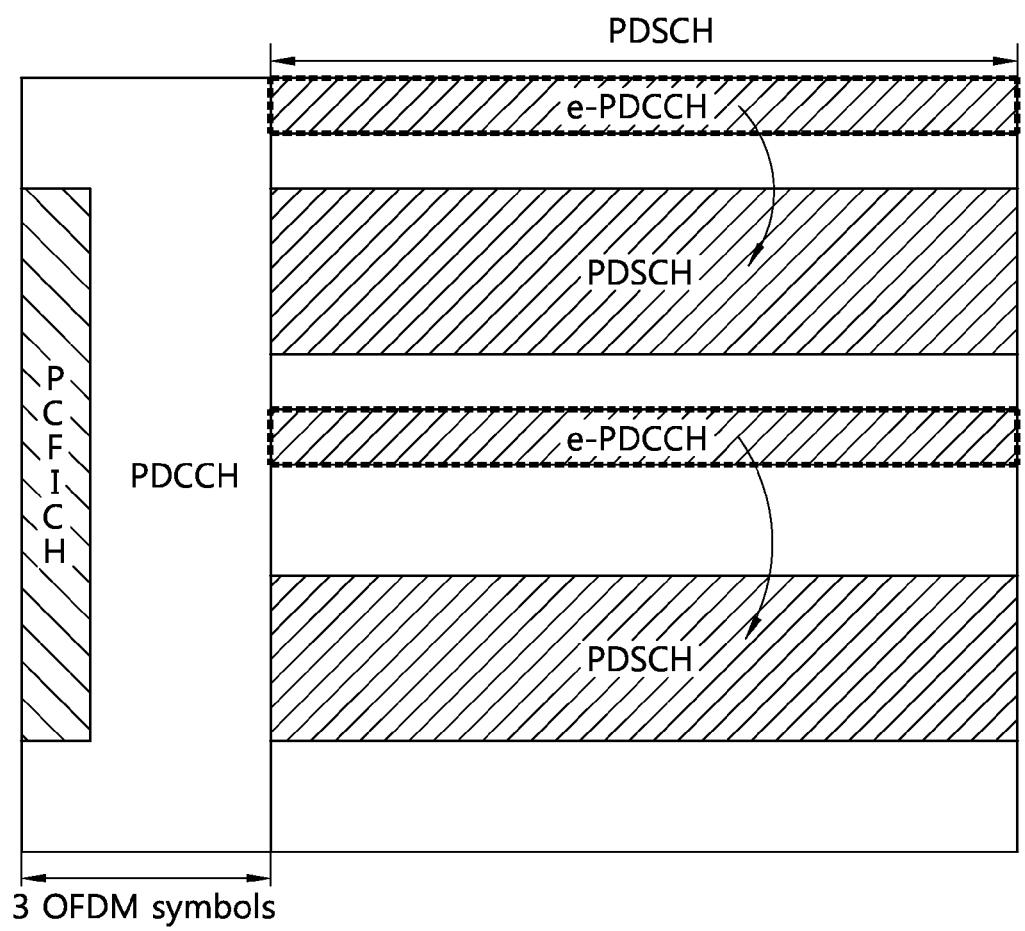
FIG. 13 shows an example of resource allocation through an e-PDCCH.

FIG. 13 shows an example of resource allocation through an e-PDCCH.

The e-PDCCH may be allocated to part of a data region rather than the conventional control region. The e-PDCCH is not provided for the existing legacy user equipments, and those user equipments supporting the 3GPP LTE rel-11 (in what follows, they are called rel-11 user equipments) may search for the e-PDCCH. The rel-11 user equipment performs blind decoding for detection of its own e-PDCCH. The information about the minimum region required for detection of the e-PDCCH may be transmitted through a newly defined e-PCFICH or the existing PDCCH. A PDSCH may be scheduled by the e-PDCCH allocated to the data region. A base station may transmit downlink data to each user equipment through the scheduled PDSCH. However, if the number of user equipments connected to each node is increased, the portion of the data region occupied by the e-PDCCH is enlarged. Therefore, the number of blind decoding that has to be performed by the user equipment is also increased, thus increasing degree of complexity.

The CRS defined for the existing systems may not be transmitted in a multi-node system. Therefore, resource elements used for transmission of CRS (hereinafter, CRS REs) may be used for various other uses. Hereinafter, when only part of a plurality of nodes are employed to transmit the CRS, a method for reusing CRS REs in a node not involved in transmitting the CRS is described. Hereinafter, it is assumed that the CRS RE corresponds to all or a part of the CRS REs in a data region or in a control region.

First of all, a case where a PDSCH is allocated to a CRS RE is described.

Figure 14:
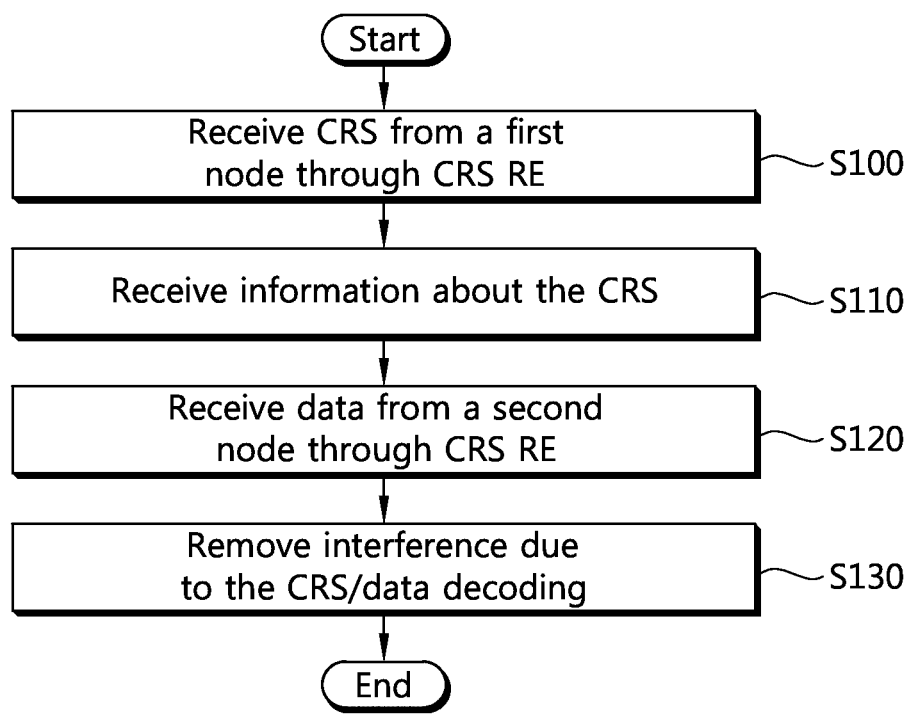
FIG. 14 shows an embodiment of a proposed method for receiving data.

FIG. 14 shows an embodiment of a proposed method for receiving data.

In step S100, a UE receives a CRS from a first node through a CRS RE. In step S110, the UE receives information about the CRS. In step S120, the UE receives data from a second node through the CRS RE. In step S130, the UE removes interference due to the CRS based on information about the CRS and decodes the received data.

Figure 15:
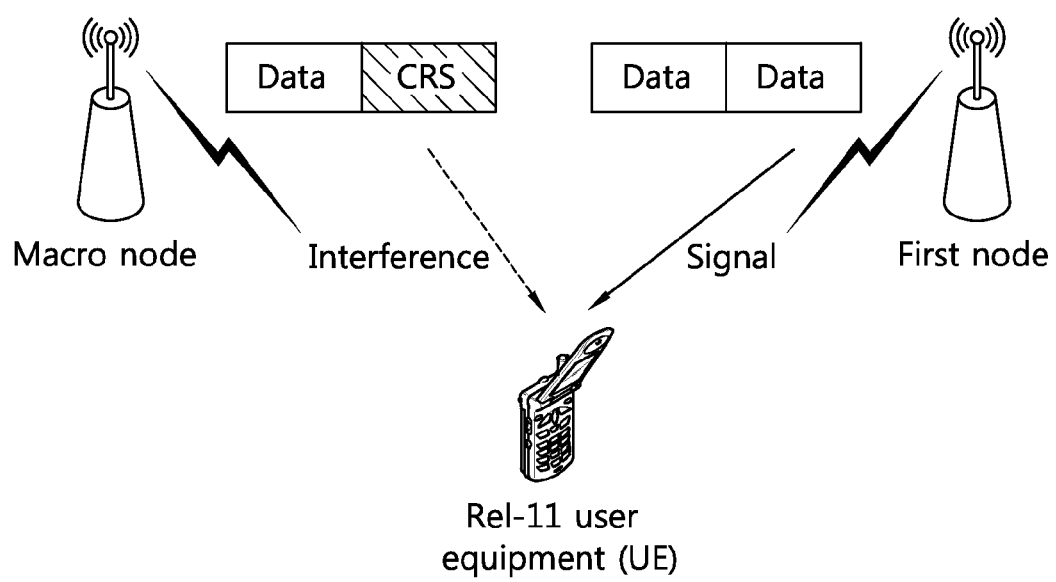
FIG. 15 shows an example of receiving data by using a CRS RE according to a proposed method for receiving data.

FIG. 15 shows an example of receiving data by using a CRS RE according to a proposed method for receiving data.

The CRS RE may be used for allocation of a PDSCH or remain in a null state. In a DMNS where a plurality of nodes use the same cell ID, a part of the nodes may transmit the CRS through the CRS RE in an arbitrary subframe while the other nodes may transmit the PDSCH through the CRS RE in the arbitrary subframe. For example, it is assumed that a first node and a second node share the same cell ID, and the second node provides higher transmission power than the first node. It is further assumed that the second node transmits the CRS through the CRS RE in an arbitrary subframe while the first node does not transmit the CRS. The CRS RE of the first node may be employed to transmit data such as the PDSCH or may remain in the null state. If the CRS RE of the first node is employed to transmit data such as the PDSCH, UEs decoding data based on the CRS may not be present within coverage of the first node. If the CRS RE of the first node remains in the null state, UEs decoding data based on the CRS may be present within coverage of the first node. Meanwhile, not only the UEs of the first node but the UEs of the second node may receive data through the CRS RE. Even if the second node is transmitting the CRS by using the CRS RE, data may be received through the CRS RE if the UE of the second node is not in a transmission mode where data is decoded by channel estimation performed based on the CRS.

Referring to FIG. 15, a macro node transmits the CRS by using the CRS RE, and a first node transmits data by using the CRS RE. In this way, when one node transmits data by using the CRS RE, the CRS transmitted from a neighboring node may exert influence on the LTE rel-11 UEs receiving data by using the CRS RE. In other words, the LTE rel-11 UEs may regard the CRS transmitted from the macro node as interference. At this time, if the UE is aware of information about the CRS, the UE may perform interference cancellation. The information about the CRS may include whether the CRS is transmitted or not, slot number required to construct a CRS sequence, OFDM symbol number, cell ID, $N_{CP}$ (it is 1 in a case of a normal CP while 0 in a case of an extended CP), etc. Through an e-PDCCH or RRC signaling, the UE may receive information about whether data is transmitted through the CRS RE and/or whether the CRS acting as interference is transmitted. According to whether data is transmitted through the CRS RE and whether the CRS is transmitted through the corresponding CRS RE, data decoding may be performed after CRS interference cancellation or without the CRS interference cancellation, or the CRS RE may be excluded from the data decoding.

The UE may receive information about whether data is transmitted through the CRS RE and/or whether the CRS acting as interference is transmitted, differently based on a type of subframe. The UE may receive from an MBSFN subframe information about existence of a CRS which is not used for data decoding or which may act as interference. If the CRS is transmitted through the CRS RE, data decoding may be performed after CRS interference cancellation is performed. The UE may receive information about whether data is transmitted through the CRS RE from a subframe other than the MBSFN subframe. The CRS interference cancellation may be performed except for the transmission mode where data decoding has to be performed based on the CRS.

Meanwhile, the UE may assume that data is not transmitted through the CRS RE regardless of the information about the CRS received from the base station in a subframe which always has to transmit the CRS, such as the one to which a physical broadcast channel (PBCH) is allocated. For example, it is preferable for a subframe to which the PBCH is allocated not to transmit data through the CRS RE. The PBCH is a kind of channel that has to be checked by the UEs trying network entry. It is difficult for the network to localize such UEs accurately and to figure out coverage of which node the corresponding UEs belong to. Since data transmission through the CRS RE incurs an adverse effect on the UEs which have to receive the CRS and decode the PBCH, it is preferable to avoid transmitting data through the CRS RE in a subframe to which the PBCH is allocated. Also, in a subframe to which a paging channel is allocated, it is preferable to avoid transmitting data through the CRS RE. This is because the network cannot easily determine coverage of which node the UE in an idle mode belongs to.

Alternatively, data may be transmitted through the CRS RE in a subframe which has to necessarily transmit the CRS. For example, in the case of a channel such as the PBCH which is transmitted only through $1$-$4^{th}$ OFDM symbols of the second slot in a subframe and fixed resources of 6 RBs, data may be transmitted through the CRS REs in the other resources depending on situations.

Hereinafter, a case where new downlink control channels such as e-PDCCH and e-PCFICH is allocated to a CRS RE is described.

Figure 16:
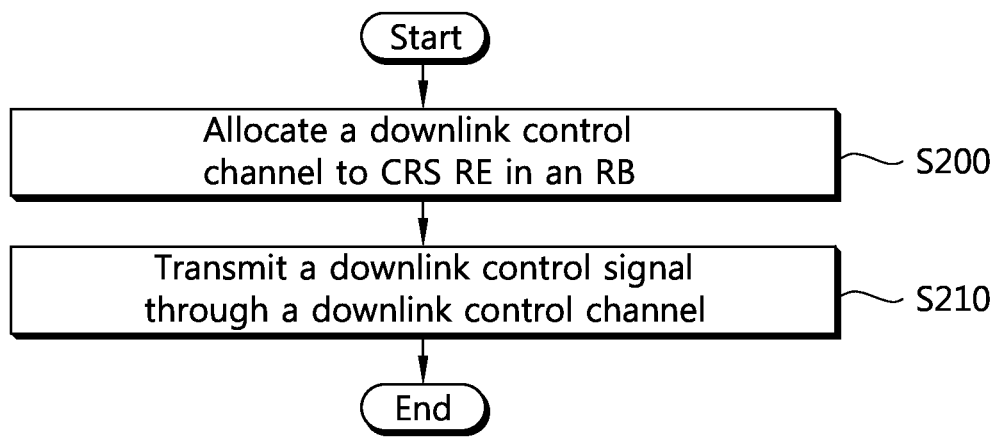
FIG. 16 shows an embodiment of a proposed method for allocating a downlink control channel.

FIG. 16 shows an embodiment of a proposed method for allocating a downlink control channel.

In step S200, a base station allocates a downlink control channel to a CRS RE in an RB. In step S210, the base station transmits a downlink control signal through the allocated downlink control channel.

For example, it is assumed that a first node and a second node share the same cell ID, and the first node transmits the CRS through the CRS RE in an arbitrary subframe while the second node does not transmit the CRS. The CRS RE of the second node may be used for a downlink control channel such as the e-PDCCH or e-PCFICH, or remain in a null state. In other words, a UE of the second node may receive the e-PDCCH or e-PCFICH through the CRS RE. The UE of the second node, depending on whether the CRS is transmitted from the first node, may detect the CRS from the CRS RE when decoding the e-PDCCH or e-PCFICH, and remove the detected CRS. The above operation may be commanded by the base station or may always be performed in a specific subframe regardless of the command of the base station. For example, since the CRS is always transmitted in a subframe to which the PBCH is allocated, the UE may detect and remove the CRS from the CRS RE when decoding the e-PDCCH or e-PCFICH.

Figure 17:
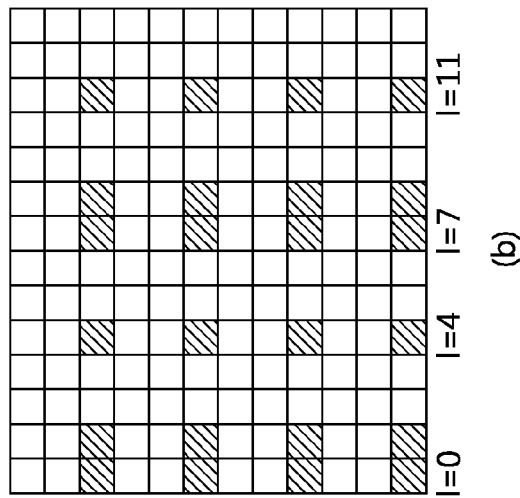
FIG. 17 shows an example of a case where a downlink control channel is allocated to a CRS RE according to a proposed method for allocating a downlink control channel.
Figure 17:
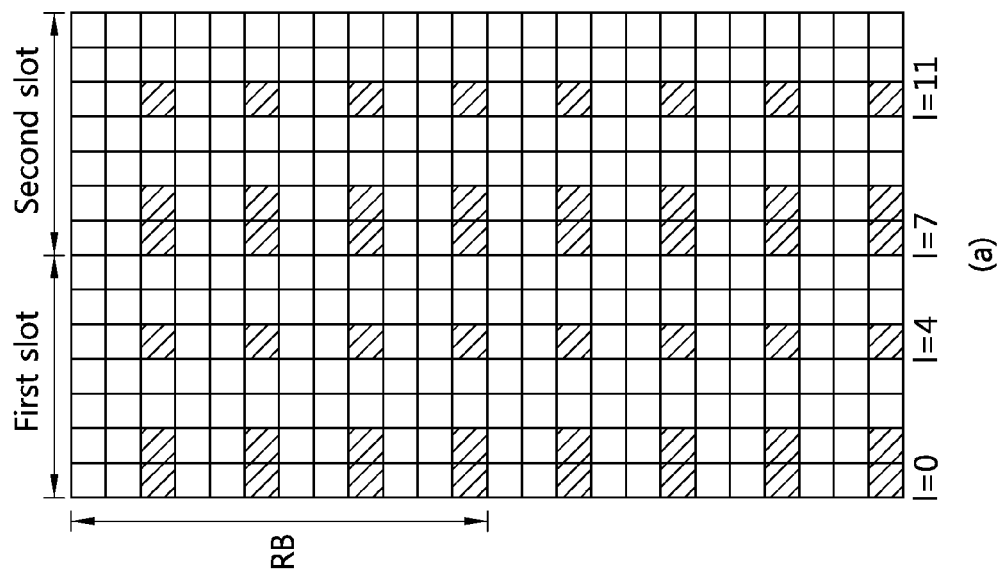

FIG. 17 shows an example of a case where a downlink control channel is allocated to a CRS RE according to a proposed method for allocating a downlink control channel.

FIG. 17-(a) shows the case where the e-PDCCH is allocated by using 36 CRS REs among 48 CRS REs distributed across two RBs. If the e-PDCCH is made of CCEs including 36 REs similarly to the PDCCH, the e-PDCCH may be allocated to 36 REs among 48 CRS REs distributed across two RBs. CRS REs remaining after the e-PDCCH is allocated may be left in the null state. FIG. 17-(b) shows the case where the e-PDCCH is allocated to 24 CRS REs in one RB and REs adjacent to the 24 CRS REs. In addition to the 24 CRS REs, the base station may allocate the e-PDCCH to the REs corresponding to the $3^{rd}$, $6^{th}$, $9^{th}$, and $12^{th}$ subcarrier of $6^{th}$ OFDM symbol of the first slot, and the REs corresponding to the $3^{rd}$, $6^{th}$, $9^{th}$, and $12^{th}$ subcarrier of $6^{th}$ and $7^{th}$ OFDM symbols of the second slot. Meanwhile, if the e-PCFICH is made of 16 REs similarly to the PCFICH, the e-PCFICH may be allocated to 16 CRS REs among 24 CRS REs in one RB. CRS REs remaining after the e-PCFICH is allocated may be left in the null state.

Figure 18:
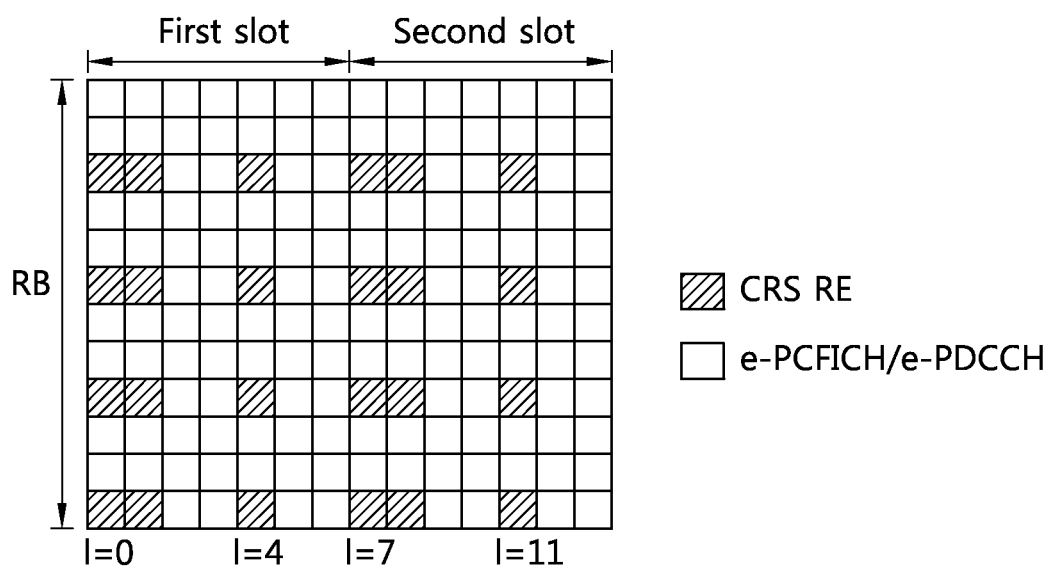
FIG. 18 shows another example of a case where a downlink control channel is allocated to a CRS RE according to a proposed method for allocating a downlink control channel.

FIG. 18 shows another example of a case where a downlink control channel is allocated to a CRS RE according to a proposed method for allocating a downlink control channel.

A downlink control channel may be allocated across part of OFDM symbols to which the CRS RE belongs. Referring to FIG. 18, the e-PDCCH is allocated to the $4^{th}$, $7^{th}$, and $11^{th}$ OFDM symbol among OFDM symbols to which the CRS RE belongs. Accordingly, 36 REs for allocating the e-PDCCH, namely one CCE, is secured. In this case, the DMRS may be used for decoding the e-PDCCH. In a VRB to which the PDSCH is allocated, the PDSCH is not allocated to the REs to which a downlink control channel such as the e-PDCCH or e-PCFICH is allocated.

Figure 19:
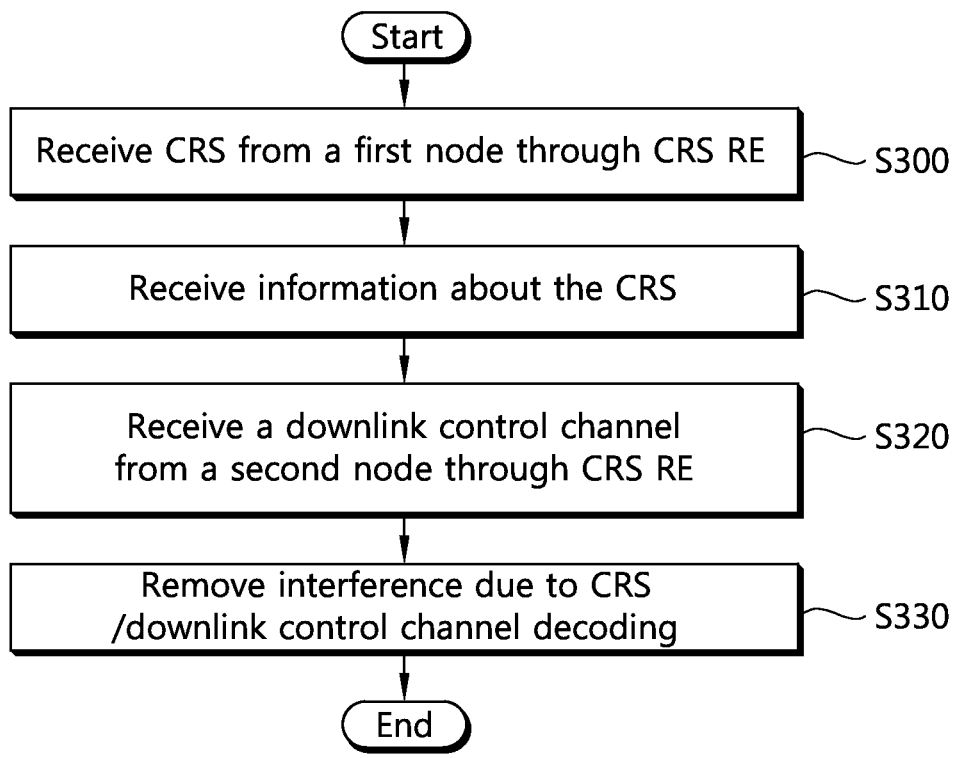
FIG. 19 shows an embodiment of a proposed method for receiving a downlink control channel.

FIG. 19 shows an embodiment of a proposed method for receiving a downlink control channel.

In step S300, the UE receives a CRS from a first node through the CRS RE. In step S310, the UE receives information about the CRS. In step S320, the UE receives a downlink control channel from a second node through the CRS RE. In step S330, the UE removes interference due to the CRS based on information about the CRS and decoded the received downlink control channel.

So far, a method for nodes in a multi-node system to reuse CRS REs to transmit data or downlink control channel has been described. However, the data or downlink control channel transmitted through the CRS RE may exert influence on the LTE rel-8 UEs which need to read the conventional CRS. Therefore, if the data or downlink control channel transmitted through the CRS RE is deemed to act as severe interference on the LTE rel-8 UEs, the CRS RE may not be reused in the corresponding region, but may be left in the null state. At this time, the corresponding region may be the time, frequency, or spatial domain. In other words, the CRS RE is not reused but may be left in the null state in a specific subframe in the time domain, in a specific RB in the frequency domain, or in a specific layer in the spatial domain.

Figure 20:
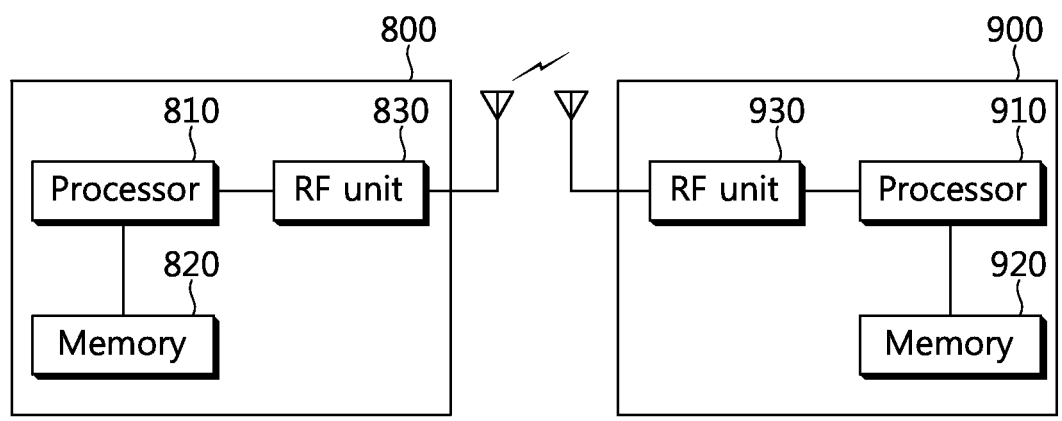
FIG. 20 is a block diagram showing wireless communication system to implement an embodiment of the present invention.

FIG. 20 is a block diagram showing wireless communication system to implement an embodiment of the present invention.

A BS 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for allocating, by a base station, a downlink control channel in a wireless communication system, the method comprising:
   allocating a downlink control channel to first cell-specific reference signal (CRS) resource elements (REs); and
   transmitting a downlink control signal through the allocated downlink control channel, wherein locations of the first CRS REs in first resource blocks (RBs) correspond to locations of second CRS REs in second resource blocks (RBs) used to transmit a CRS by another base station, and wherein each of the base station and the another base station is a node included in a multi-node system.

2. The method of claim 1, wherein the downlink control channel is an enhanced physical downlink channel (e-PDCCH) which is a downlink control channel for the multi-node system.

3. The method of claim 2, wherein the e-PDCCH is allocated to a maximum of 36 CRS REs in the first RBs.

4. The method of claim 2, wherein the e-PDCCH is allocated to the first CRS REs in the first RBs and a part of REs adjacent to the first CRS REs.

5. The method of claim 4, wherein the e-PDCCH is allocated to a maximum of 36 REs in the first RBs.

6. The method of claim 1, wherein the downlink control channel is an enhanced physical control format indicator channel (e-PCFICH) which is a downlink control channel for the multi-node system.

7. The method of claim 6, wherein the e-PCFICH is allocated to a maximum of 16 REs in the first RBs.

8. A method for receiving, by a user equipment, a downlink signal in a wireless communication system, the method comprising:

receiving a cell-specific reference signals (CRSs) via first CRS resource elements (REs) from a first node on a first subframe;

receiving downlink control data from a second node via second CRS REs on a second subframe; and decoding the received downlink control data by removing interference due to the CRSs, wherein the first node and the second node have a same cell identifier (ID), wherein each of the first node and the second node is a node included in a multi-node system, wherein the first subframe overlaps the second subframe in a time domain, and wherein locations of the first CRS REs in the first subframe correspond to locations of second CRS REs in the second subframe used to transmit the CRS.

9. The method of claim 8, wherein the downlink control data is received through an enhanced physical downlink channel (e-PDCCH) or enhanced physical control format indicator channel (e-PCFICH) which is a downlink control channel for the multi-node system.

10. The method of claim 8, further comprising:

receiving information related to whether the CRSs are present or not, wherein the removing interference due to the CRSs is performed based on information related to the CRS.

* * * * *